United States Patent [19]

Takahashi et al.

[11] Patent Number: 5,127,050
[45] Date of Patent: Jun. 30, 1992

[54] INFORMATION PROCESSING APPARATUS SEPARABLY COMBINED WITH TELEPHONE UNIT

[75] Inventors: Hidenobu Takahashi, Hitachi; Seiichi Hayashi, Yokohama; Kengo Ando, Sagamihara, all of Japan

[73] Assignee: Hitachi, Ltd., Tokyo, Japan

[21] Appl. No.: 419,954

[22] Filed: Oct. 11, 1989

[30] Foreign Application Priority Data

Oct. 14, 1988 [JP] Japan .................. 63-257175

[51] Int. Cl.⁵ .................. H04M 1/00; H04M 11/00
[52] U.S. Cl. .................. 379/428; 379/419; 379/56; 379/58; 379/61
[58] Field of Search .................. 379/61, 62, 82, 90, 379/96, 110, 419, 428, 441, 56, 58, 59; 364/705.05; 346/145

[56] References Cited

U.S. PATENT DOCUMENTS

| | | | |
|---|---|---|---|
| 4,456,793 | 6/1984 | Baker et al. | 379/56 |
| 4,634,845 | 2/1987 | Hale et al. | 379/96 |
| 4,639,550 | 3/1987 | Yamagawa et al. | 379/62 |
| 4,661,659 | 4/1987 | Nishimura | 379/61 |
| 4,782,522 | 11/1988 | Kramer et al. | 379/368 |
| 4,827,085 | 5/1989 | Yaniv et al. | 178/18 |
| 4,837,590 | 6/1989 | Sprague | 346/145 |
| 4,839,921 | 6/1989 | Awakowicz et al. | 379/428 |
| 4,972,457 | 11/1990 | O'Sullivan | 379/59 |
| 4,991,197 | 2/1991 | Morris | 379/58 |

FOREIGN PATENT DOCUMENTS

0363956 4/1990 European Pat. Off. .......... 379/96

OTHER PUBLICATIONS

Hansbauer, Schön, "Modular Telephone User Equipment Line" Telefon Report, Mar. 1973.
Motorola "The Cellular Connection Accessory", 1986.

*Primary Examiner*—James L. Dwyer
*Assistant Examiner*—William D. Cumming
*Attorney, Agent, or Firm*—Antonelli, Terry Stout & Kraus

[57] ABSTRACT

An information appliance in which a telephone unit having at least a telephone function and an information processing apparatus having at least a data input/processing function are arranged so as to be capable of being used separably or of being combined with each other through inter connection means provided therebetween, so that the telephone unit and the information processing apparatus are electrically connected to each other when the telephone unit and the information processing apparatus are combined with each other.

11 Claims, 8 Drawing Sheets

INFORMATION PROCESSING APPARATUS SEPARABLY COMBINED WITH TELEPHONE UNIT

BACKGROUND OF THE INVENTION

The present invention relates to an information appliance having both a telephone function and a data input/processing function similar to those provided in a word processor, an electronic telephone directory, or the like.

As the information appliance of the type as described above, there has been developed a system in which a portable word processor and an apparatus having a telephone function are connected to each other through a signal cable so that the former carries out data input/processing and the latter carries out data transmission.

However, the above information appliance has the following defects.

(1) The physical and electrical connection between the two equipments is troublesome or requires much time and much labor.

(2) The configuration of the two equipments after completion of connection is large in size.

(3) It is difficult to know whether the connection between the two equipments has been performed correctly or not.

(4) The system function is lowered when the two equipments are separated from each other.

SUMMARY OF THE INVENTION

It is therefore an object of the present invention to eliminate the above defects in the prior art.

It is another object of the present invention to provide an information appliance which is very excellent in operational property in use.

To attain the foregoing objects, according to the present invention, the information appliance comprises a telephone unit having at least a telephone function and an information processing apparatus having at least a data input/processing function, the telephone unit and the information processing apparatus being arranged so as to be capable of being combined with each other, the information processing apparatus including a control portion at least capable of conducting control of the data input processing function when the information processing apparatus body is separated from the telephone unit, the telephone unit including a telephone control portion at least capable of conducting control of the telephone function when the telephone unit is separated from the information processing apparatus, the information processing apparatus control portion and the telephone unit control portion being physically combined and electrically connected to each other so that the telephone function and the data input processing function are systematically processed.

In the case where the information processing apparatus having the data input processing function is to be operated independently, it can be used under a condition that it is separated from the telephone unit. In this case, the telephone unit can fulfill its telephone function without being affected by the separation from the information processing apparatus.

In the case where the telephone unit and the information processing apparatus are combined with each other into one body, the telephone unit control portion for performing the control of the telephone function and the information processing apparatus control portion for performing the control of the data input processing function are connected to each other so that the two control portions are systematized easily. When the information processing apparatus and the telephone unit are combined into one body, the dial operation can be made more easily by using wide-screen input means in the body and, at the same time, it is made possible to perform electric charging to the body.

BRIEF DESCRIPTION OF THE DRAWINGS

Other features and advantages of the present invention will be apparent from the following description taken in connection with the accompanying drawings illustrating an embodiment of the present invention, in which.

DESCRIPTION OF THE PREFERRED EMBODIMENT

An embodiment of the present invention will be described hereunder with reference to the drawings.

Figure 1:
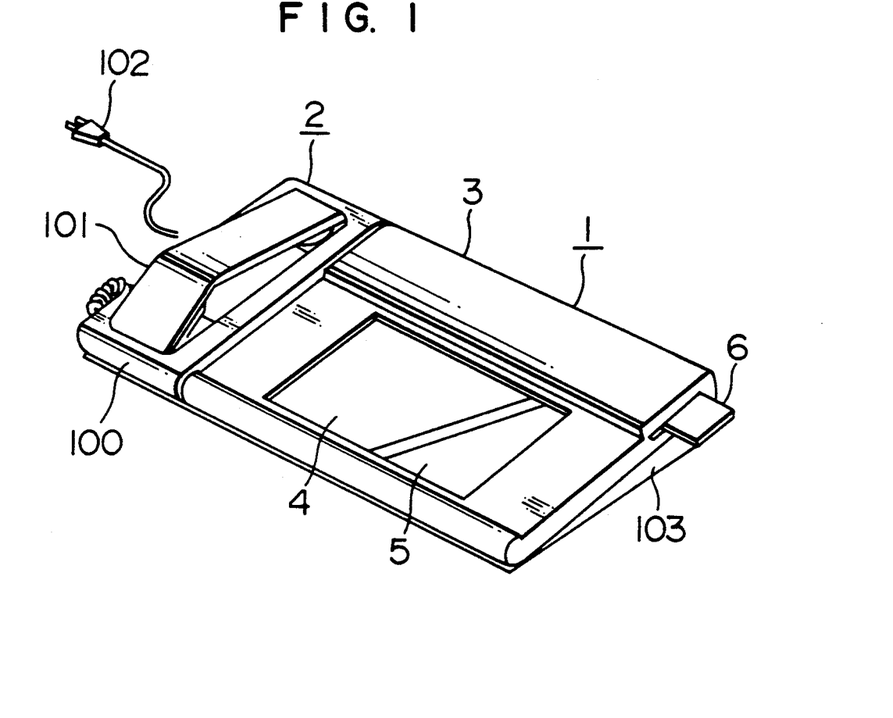
FIG. 1 is an external view of an information appliance when systematized.
Figure 2:
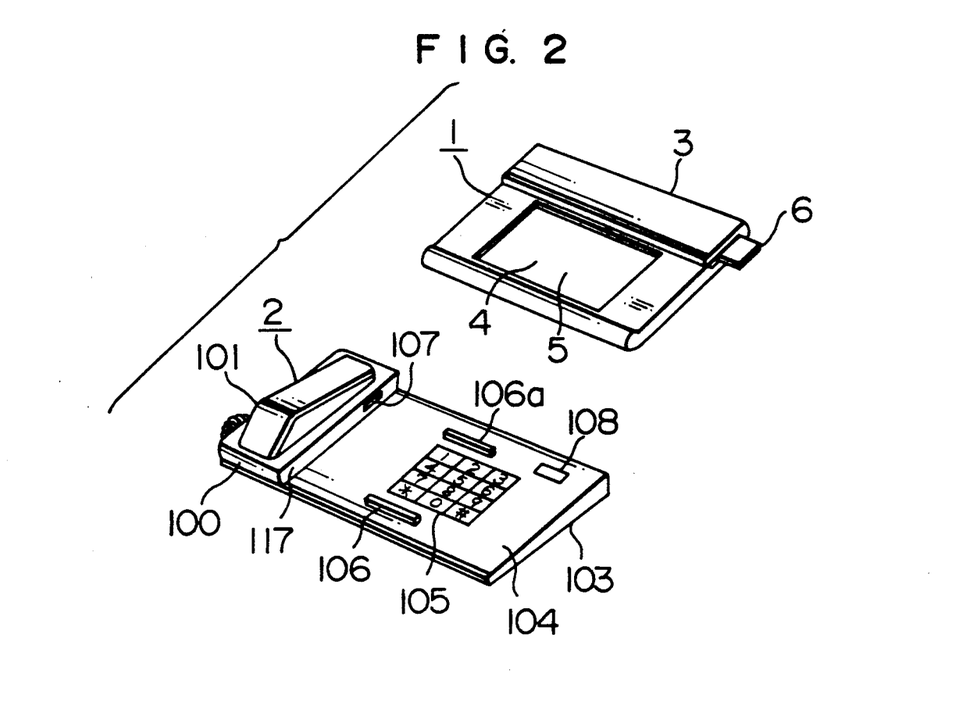
FIG. 2 is an external view of the appliance when separated.
Figure 3:
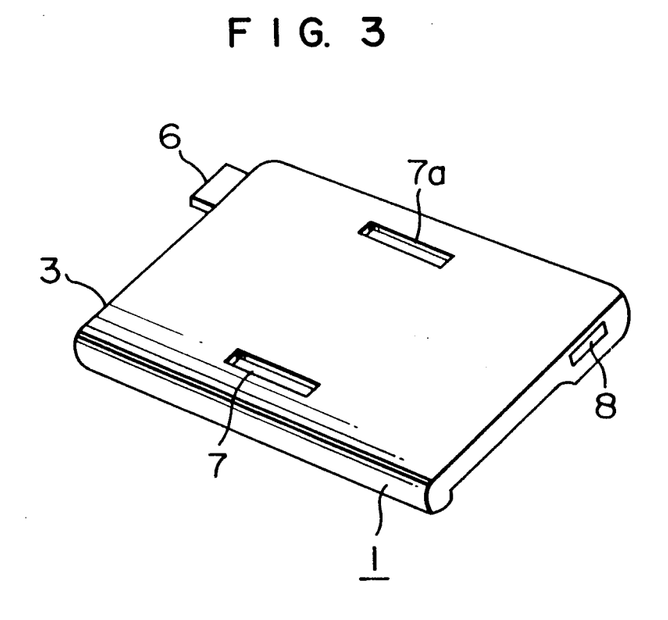
FIG. 3 is a rear view of the information processing apparatus.

Referring to FIG. 1, there is shown an external view of an information appliance systematized according to the present invention. An information processing apparatus 1 (hereinafter simply referred to as "apparatus 1") is constituted by a body case 3, a transparent touch panel 4, and a liquid crystal display unit 5. A memory card 6 as an external storage is set in the body 1. On the other hand, a telephone unit 2 is constituted by a handset mount portion 100 for mounting a handset 101 thereon, a body mount portion 103 for mounting the apparatus 1 thereon, and an electric source plug 102. FIG. 2 shows the condition in which the apparatus 1 is separated from the telephone unit 2. FIG. 3 shows a rear portion of the apparatus 1. The telephone unit 2 has a slant portion 104 on which dial buttons 105 and an indication lamp 108 are provided and on which engagement projections 106 and 106a are formed. A unit signal window 107 is provided in a side wall 117 which extends from the slant portion 104 to form the handset mount portion 100. On the other hand, engagement recesses 7 and 7a engageable with the engagement projections 106 and 106a of the telephone unit 2 are provided in the bottom surface of the apparatus 1 for performing positioning between the telephone unit 2 and the apparatus 1. A signal window 8 is provided in a side wall of the apparatus 1 at a position corresponding to the signal window 107 of the telephone unit 2.

Figure 4:
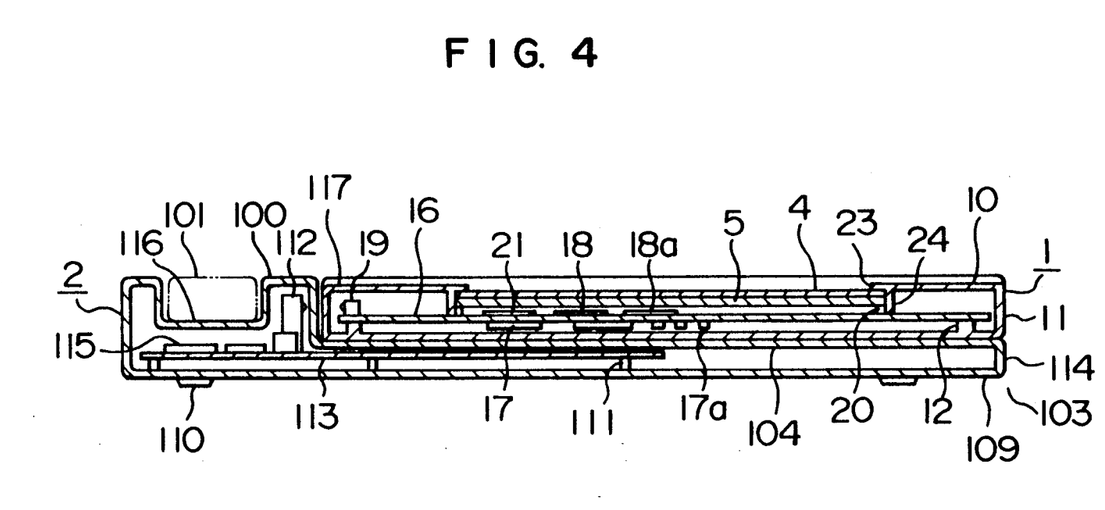
FIG. 4 is a partly sectional view of the appliance when systematized.

The inside configuration of the information appliance will be described in detail with reference to FIG. 4 et seq.

First, the configuration of the apparatus 1 will be described. The apparatus 1 has a body outer portion constituted by a body upper case 10 and a body lower case 11. A substrate 16 is mounted on a substrate seat 12 which is suitably provided in the lower case 11. The substrate 16 has control circuit parts 17 and 17a, liquid crystal drive circuit parts 18, 18a, 18b and 18c, and a light receiving/emitting element 19 for signal transmission between the apparatus 1 and the telephone unit 2, the parts 17 and 17a being mounted on the lower surface of the substrate 16, the parts 18, 18a through 18c and the element 19 being mounted on the upper surface of the substrate 16. On the other hand, a case opening portion 23 is provided in the substantially middle upper of the upper case 10. The touch panel 4 supported by a supporting rib 24 provided in the case 10 and the liquid crystal display unit 5 being in contact with the lower surface of the touch panel 4 are provided in the opening portion 23. The liquid crystal display unit 5 and the touch panel 4 are electrically connected to a control circuit 21 through contact with electrically conductive zebra rubber 20 mounted on a current conduction terminal of the body substrate 16, so that the liquid crystal display unit 5 and the touch panel 4 are controlled by the control circuit 21.

Figure 5:
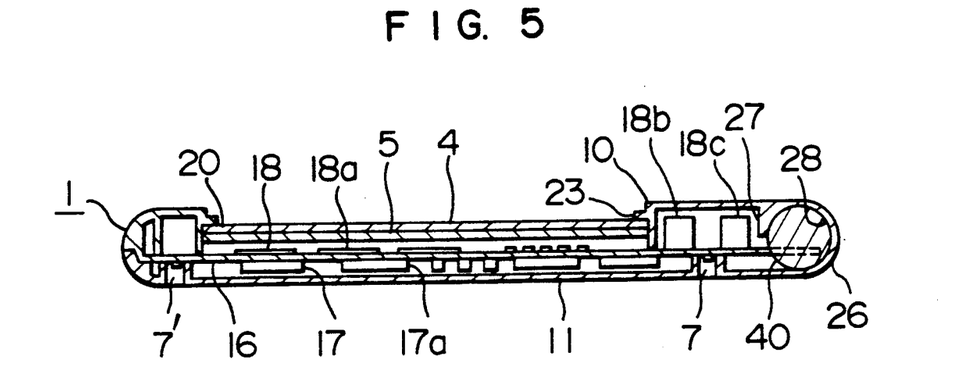
FIG. 5 is a partly sectional view of the information processing apparatus.
Figure 6:
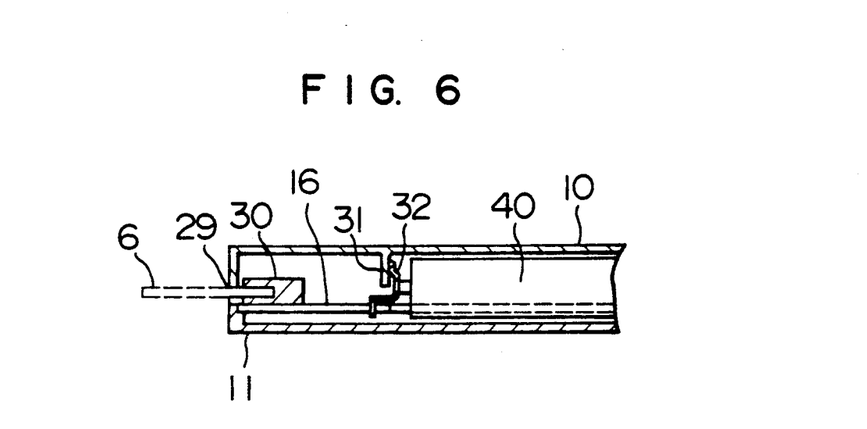
FIG. 6 is a sectional view for explaining the inside of the information processing apparatus.
Figure 7:
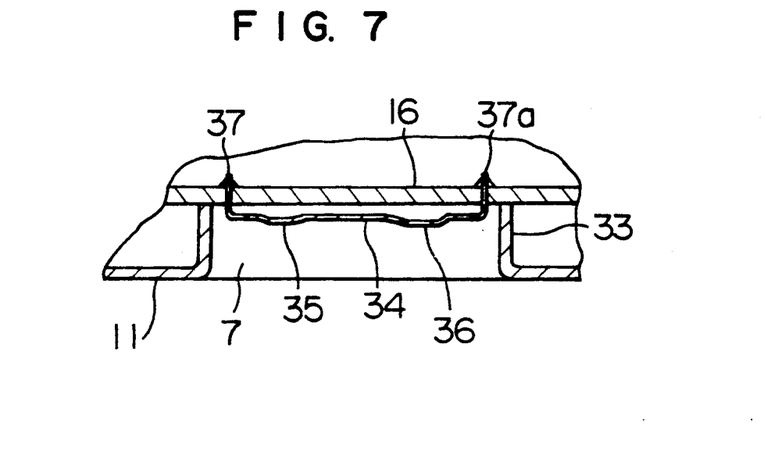
FIG. 7 is a sectional view of the engagement recess of the information processing apparatus.

On the other hand, the lower case 11 has a battery seat 26 formed at one end thereof as shown in FIG. 5. A chargeable battery 40 represented by an Ni-Cd battery is received in a space which is defined by the battery seat 26 formed in the lower case 11 and a battery cover 28 and a battery rib 27 formed in the upper case 10. As shown in FIG. 6, the battery 40 is mounted on the substrate 16 and electrically connected to the control circuit 21 through a battery terminal 32 supported by a supporting projection 31 provided in the upper case 10. Further, a memory card connector 30 is mounted on the substrate 16 so as to be capable of being connected to the memory card 6 inserted into a memory card aperture 29 provided in the upper case 10. Further, as shown in FIG. 7, the engagement recess 7 defined by surrounding walls 33 is formed in the lower case 11 and a terminal 34 is connected and mounted to the substrate 16 at its terminal end portions 37 and 37a so that the terminal 34 is exposed to the outside. To make the contact reliability high at the time of systematization of the information appliance, the terminal 34 is provided with terminal protrusion portions 35 and 36.

Figure 8:
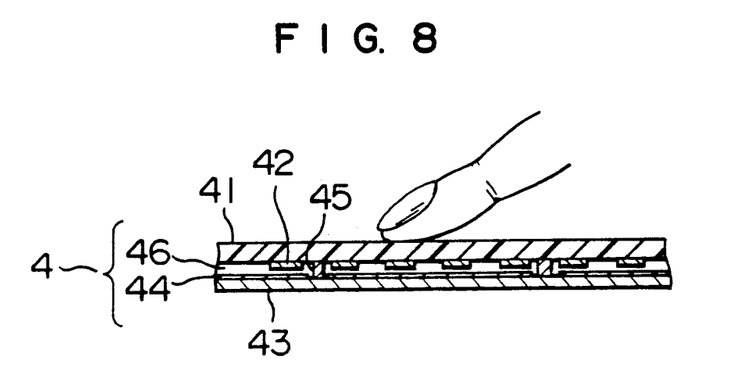
FIG. 8 is a partly sectional view of the touch panel.
Figure 9:
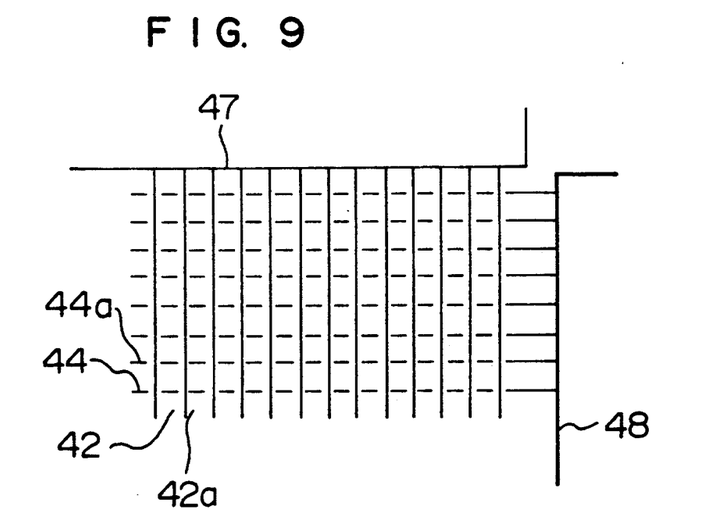
FIG. 9 is a view for explaining the touch panel electrode.

In the following, the configuration of the touch panel 4 is described. As shown in FIG. 8, the touch panel 4 is mainly constituted by a transparent upper plate 41 formed of a flexible material, such as synthetic resin, thin sheet glass or the like, and a transparent lower plate 43 having relatively high stiffness. Upper plate conductors 42, 42a, ... ... each formed of a super-thin transparent electrically conductive material, such as indium oxide or the like, and having one end connected to an upper plate common electrode 47, are formed on the lower surface of the transparent upper plate 41. Lower plate conductors 44, 44a, ... ... each formed in the same manner as described above and having one end connected to a lower plate common electrode 48 are formed on the upper surface of the transparent upper plate 43. The two groups of conductors 42, 42a, ... ... and 44, 44a, ... ... are arranged so that a fine distance 46 is maintained between the group of conductors 42, 42a, ... and the group of conductors 44, 44a, ... ... by spacers 45. When the transparent upper plate 41 is pressed, for example, by a finger or the like, the transparent upper plate 41 is moved down to make contact selectively between one of the upper plate conductors 42, 42a, ... ... and a corresponding one of the lower plate conductors 44, 44a, ... ... so that the depressed position is detected.

In the following, the configuration of the telephone unit 2 is described. As shown in FIG. 4, the telephone unit 2 has a body outer portion constituted by a lower case 109 and an upper case 114. A substrate 113 is mounted on a substrate seat 111 provided on the inner surface of the lower case 109. Unit control circuit parts 116, a light receiving/emitting element 112 for signal transmission between the unit 2 and the apparatus 1, and the like, are mounted on the substrate 113.

Figure 10:
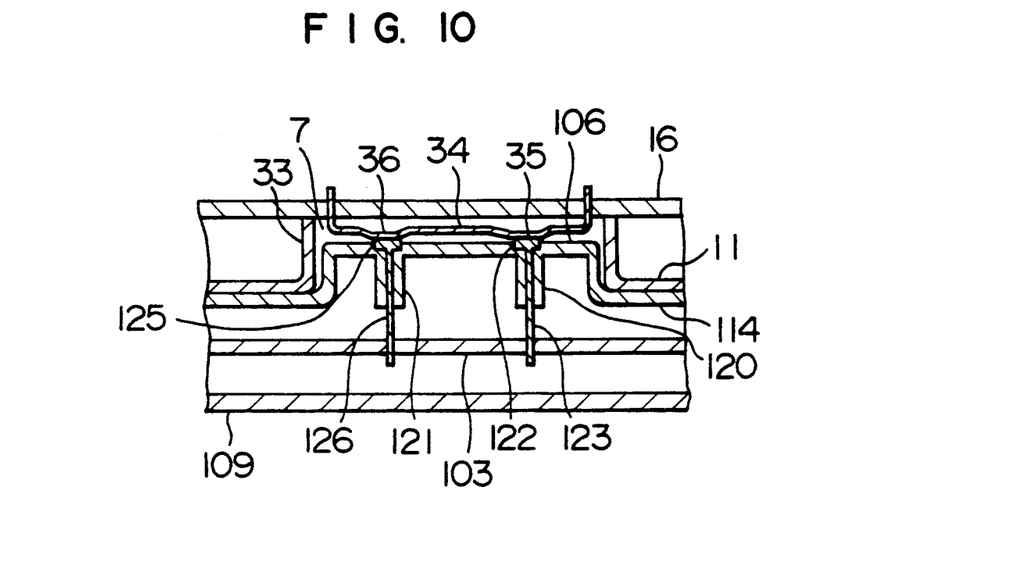
FIG. 10 is a sectional view of the engagement portion of the appliance when systematized.

On the other hand, the upper case 114 is mainly constituted by the handset mount portion 100 and the body mount portion 103. The body mount portion 103 has a slant portion 104 formed as described above (Refer to FIG. 2). The engagement projections 106 and 106a are provided on the slant portion 104. As shown in FIG. 10, conductor guides 120 and 121 are provided in the engagement projection 106 formed integrally with the upper case 114. Conductor terminals 123 and 126 are mounted on the conductor guides 120 and 121 respectively. The conductor terminals 123 and 126 have respective ends provided with conductor contacts 122 and 125 exposed to the upper surface of the engagement projection 106 and the other ends electrically connected to the unit substrate 103. Accordingly, the conductor terminals 123 and 126 are electrically connected to the terminal protrusion portions 35 and 36 of the terminal 34 when the body 1 is mounted on the unit 2. A plurality of legs 110 are provided on the bottom surface of the unit lower case 109.

Figure 11:
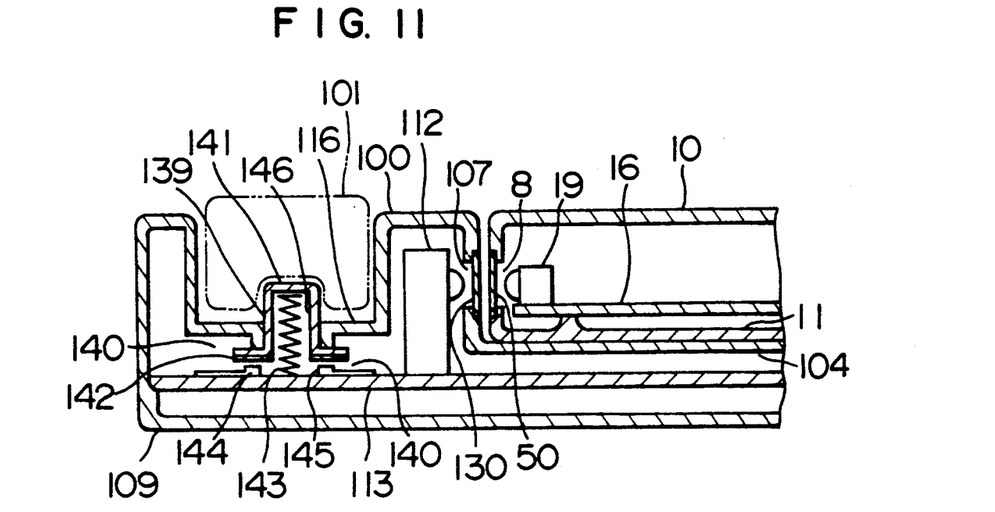
FIG. 11 is a partly sectional view of the appliance when systematized.

In the following, the handset mount portion 100 for mounting the handset 101 and its vicinity are described with reference to FIG. 11. The handset mount portion 100 is connected to the mount portion 104 of the apparatus 1 through the side wall 117. The signal window 107 is provided in the side wall 117 so as to face the signal window 8 when the apparatus 1 is mounted on the unit 2. A protection light-transmissible plate 130 is provided in the window 107. The light receiving/emitting element 112 mounted on the substrate 113 is provided so as to face the protection light-transmissible plate 130. The light receiving/emitting element 112 is disposed so as to be opposite to the light receiving/emitting element 19 with a protection light-transmissible plate 50 interposed therebetween. On the other hand, the handset mount portion 100 has a U-shaped handset seat 116 provided with a hook switch 140 which is constituted by a movable piece 141 slidably supported by a switch opening portion 139, a movable contact 142, a spring 143 set in a spring chamber 146, and fixed contacts 144 and 145. The hook switch 140 serves to detect the presence of the handset 101 having a telephone transceiver portion, to thereby turn the telephone unit 2 to a suitable state (talk, standby).

Figure 12:
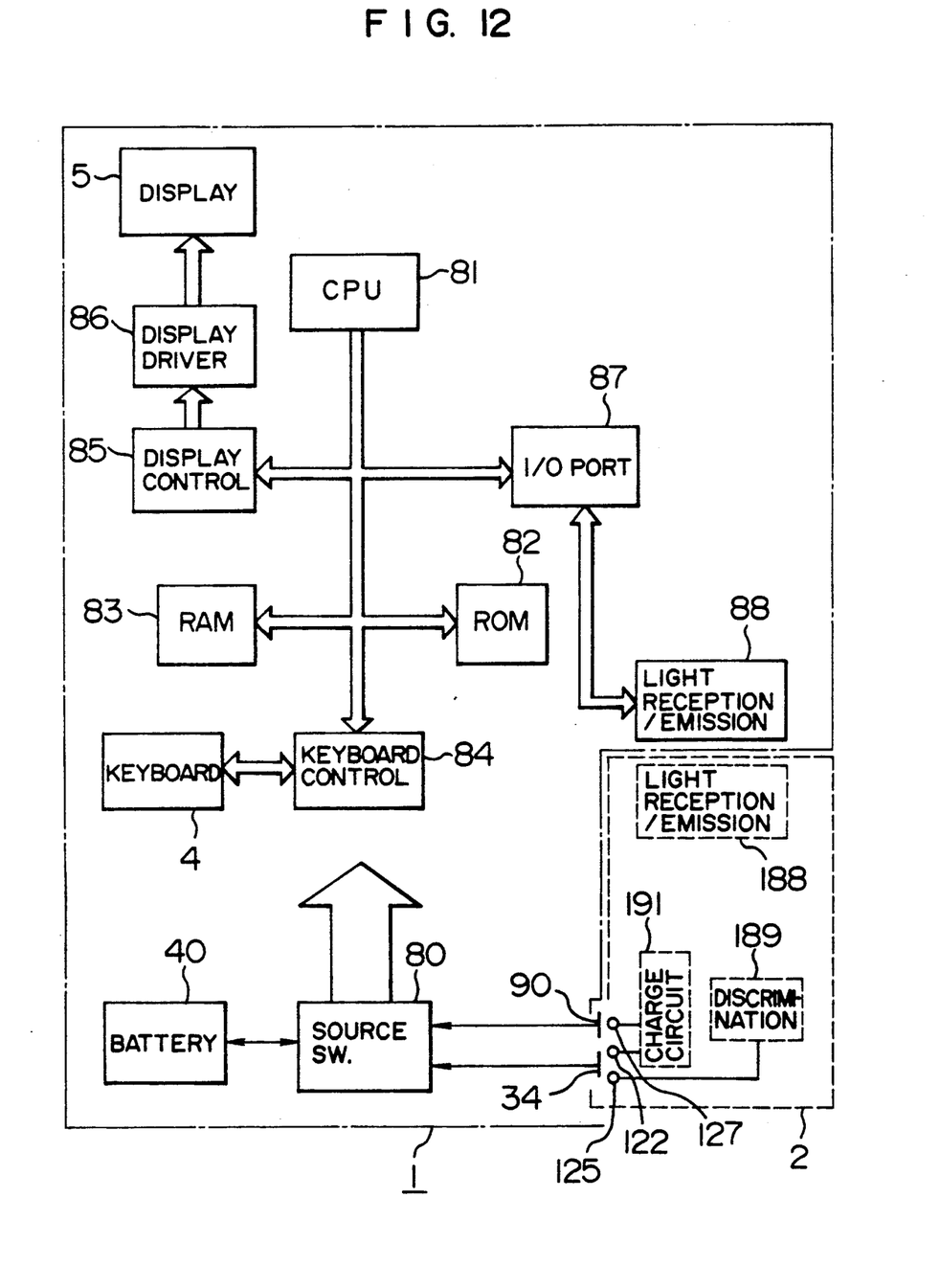
FIG. 12 is a block diagram of the information processing apparatus control circuit.

In the following, the configurations of the two control portions are described. FIG. 12 is a block diagram of the control portion of the apparatus 1. The control portion is constituted by: a body CPU 81 for performing control over the total system; a ROM 82 having fixed data such as programs, character fonts, etc.; a RAM 83 for storing data; a keyboard control portion 84; a touch panel keyboard 4; a display control portion 85 for the liquid crystal display unit 5; a display driver 86; a light receiving/emitting portion 88 for signal transmission between the apparatus 1 and the telephone unit 2; and a signal control I/0 port 87. Electric power is supplied, via an electric source switching portion 80, from terminals 34 and 90 connected to the conductor contacts 122, 125 and 127 of the telephone unit 2. Further, the chargeable battery 40 is connected to the electric source switching portion 80 so that the battery 40 can be used as an electric source portion of the apparatus 1 when the apparatus 1 is separated from the telephone unit 2 and that the battery 40 can be suitably charged by power supply from the telephone unit 2 when the apparatus 1 is mounted on the telephone unit 2.

Figure 13:
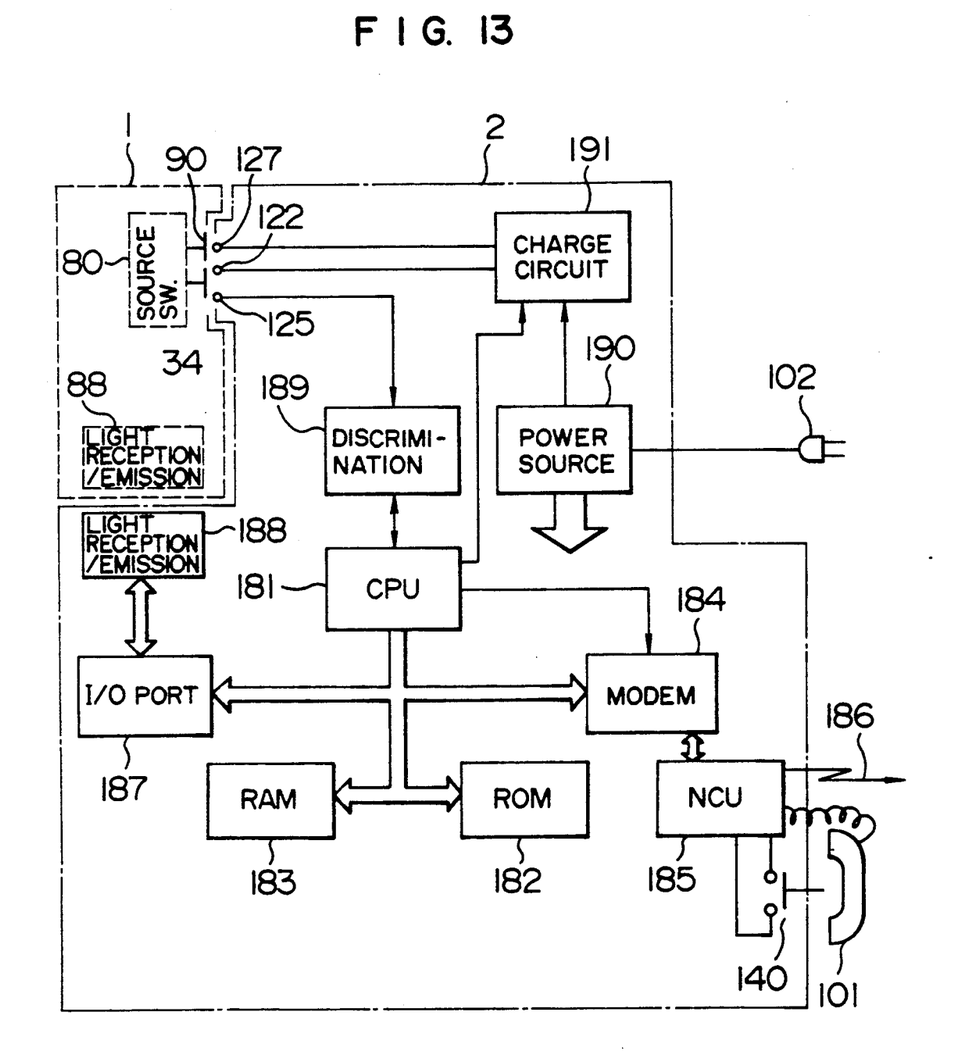
FIG. 13 is a block diagram of the telephone unit control circuit.

In the following, the configuration of the control portion of the telephone unit 2 is described with reference to FIG. 13. The control portion of the telephone 2 is constituted by a CPU 181, a unit ROM 182, a RAM 183, a light receiving/emitting portion 188 and an I/O port 187, similarly to that of the body 1. The control portion of the telephone unit 2 further has an NCU 185 acting as a network control unit provided with a modem 184 acting as a modulation/demodulation device. The hook switch 140 and the handset 101 are connected to the NCU 185 which is connected to a telephone line 186. With respect to a power supply system, the unit 2 is energized through an electric source circuit 190 from the electric source plug 102 and, at the same time, the apparatus 1 is energized from the conductor contacts 122 and 125 through a charging circuit 191. Further, a discrimination circuit 189 is energized through the terminal 34 of the apparatus 1. Accordingly, the circuit can discriminate between mounting and demounting of the body 1, so that the information of discrimination can be inputted into the CPU 181.

As described above, this embodiment is based on the system configuration in which the system is separated into two, that is, the information processing apparatus 1 as a portable information apparatus and the telephone unit 2 connected to a telephone line, so that the two can be freely mounted to and separated from each other. The apparatus 1 and the telephone unit 2 respectively have independent functions and totally have a system function obtained by combination of the two when the two are mounted to each other. In short, the apparatus 1 has a data input processing function, such as that of a word processor and that of an electronic telephone directory, as a portable information apparatus and also has a system control function which operates when the two are systematized. The telephone unit 2 has a general telephone function, a body-substitution function which operates when the apparatus 1 is separated from the unit 2, and also has a system control auxiliary function which operates when the two are systematized. In systematization of the two constituent parts (in mounting of the apparatus 1 on the telephone unit 2), the system is constituted so that the apparatus is mounted on the upper portion of the telephone unit 2; positioning portions are provided to the two, respectively; and when systematized, electrical connection and signal connection between the two are made, by which large-screen display is made possible in spite of the small setting area of the apparatus and by which electrical charging to the apparatus 1 is made automatically. Furthermore, in the configuration of the apparatus 1, the substrate for drive control of liquid crystal as a display unit and the substrate for performing data processing are integrated with each other to thereby make it possible to reduce the weight and size of the apparatus and, at the same time, the transparent touch panel is provided on the display unit to thereby improve portability of the apparatus including the input device and improve the operational property of the touch dial or the like when systematized. Further, a slant surface is given to the mount surface of the telephone unit 2 to thereby obtain an appliance which is so excellent in operational property that the dial operation is not lost when the telephone unit 2 is used singly and that the liquid crystal surface of the display unit is automatically kept at an angle easy to see for the operator when the telephone unit 2 is systematized with the apparatus 1.

According to this embodiment, the following advantages can be obtained.

(1) Because the apparatus 1 and the telephone unit 2 are provided so as to be separable from each other and respectively provided with the independent control means, they can be used independently when separated and, in particular, the apparatus 1 can be used as a portable information apparatus.

(2) Because the apparatus control circuit parts 17 and 17a and the liquid crystal drive circuit parts 18, 18a, 18b and 18c are mounted on the substrate 16 of the apparatus 1, the weight and size of the apparatus 1 can be reduced as compared with the conventional construction requiring respectively independent control substrates and, accordingly, not only the portability of the apparatus 1 can be improved but also space in mounting the apparatus 1 on the telephone unit 2 can be reduced.

(3) Because the apparatus 1 is mounted to the upper surface of the telephone unit 2, space in systematization can be reduced to make it easy to use the appliance on a desk.

(4) Because the engagement recesses 7 and 7a of the apparatus 1 and the engagement projections 106 and 106a of the telephone unit 2 to be engaged with each other are respectively provided in the apparatus 1 and the telephone unit 2, position shifting in systematization (when the apparatus 1 is mounted on the telephone unit 2) can be prevented to thereby secure signal transmission between the two.

(5) Because contacting terminals are provided in the engagement recesses 7 and 7a and the engagement projections 106 and 106a, displacement of the terminals can be prevented to thereby secure electrical connection.

(6) Because the discrimination circuit portion 189 for discriminating between mounting and demounting of the apparatus 1 is provided in the telephone unit 2, the systematized state can be detected automatically.

(7) Because the electricity-receiving terminal 34 is used as a detection terminal for detecting the systematized state, cost can be saved.

(8) Because the mount portion 104 of the telephone unit 2 serves as a slant surface, the liquid crystal display unit 5 is automatically inclined down to the front when the apparatus 1 is mounted on the telephone unit 2, so that the display surface becomes easy to see and easy to handle.

(9) Because the dial buttons 105 are provided on the mount portion 104 of the telephone unit 2, the slant surface makes the dial operation easy without losing the telephone function when the apparatus 1 is separated from the telephone unit 2.

(10) Because the transparent touch panel 4 is provided on the liquid crystal display unit 5 of the apparatus 1, the dial function can be used as a soft keyboard (configuration in which a dial is displayed on the display unit; and a dial signal is generated by touching the touch panel and is transmitted to the telephone unit 2 through signal transmission means) when systematized. This configuration does not require the exposure of the dial buttons 105. Accordingly, the mounting of the apparatus 1 on the dial buttons 105 is made possible. Consequently, space in systematization can be reduced or in other words the size of the liquid crystal display unit can be increased with respect to the same space, so that the configuration is excellent in operational property.

According to the present invention, the information appliance comprises a telephone unit having at least a telephone function and an information processing apparatus having at least a data input/processing function, the telephone unit and the information processing apparatus being arranged so as to be capable of being separated or combined with each other, the information processing apparatus including a control portion at least capable of conducting control of the data input processing function in a condition in which the information processing apparatus is separated from the telephone unit, the telephone unit including a telephone control portion at least capable of conducting control of the telephone function in a condition in which the telephone unit is separated from the information processing apparatus, the apparatus control portion and the telephone unit control portion being electrically connected to each other so that the telephone function and the data input processing function are systematically processed in a condition in which the information processing apparatus and the telephone unit are combined with each other. Accordingly, the information processing apparatus and the telephone unit can be used not only separately and independently of each other, but also in combination with each other through easy connection between the apparatus control portion (for performing the control of the data input processing function included in the information processing apparatus) and the telephone unit control portion (for performing the control of the telephone function included in the telephone unit), so that it is possible to provide an information appliance excellent in operational property.

We claim:

1. An information appliance comprising a telephone unit having a telephone function and an information processing apparatus capable of performing only data input and data processing functions, said telephone unit and said information processing apparatus each being capable of being physically separated so as to be operated separately from each other and physically joined with said information processing apparatus mounted on said telephone unit so as to be operated in combination with each other, said information processing apparatus including an apparatus control portion at least capable of conducting control of said data input and data processing functions when said information processing apparatus is physically separated from said telephone unit, said telephone unit including a telephone control portion at least capable of conducting control of said telephone function when said telephone unit is physically separated from said information processing apparatus, said apparatus control portion and said telephone unit control portion being electrically and mechanically connectable to each other with said information processing apparatus being mounted on said telephone unit so that data input for said telephone function and said data processing function can be effected only through said apparatus control portion when said information processing apparatus and said telephone unit are electrically and mechanically connected with each other.

2. An information appliance according to claim 1, in which said telephone unit is of a stationary type, and said information processing apparatus is of a portable type.

3. An information appliance according to claim 1, in which a positioning mechanism is provided so that said positioning mechanism operates when said information processing apparatus and said telephone unit are to be combined with each other.

4. An information appliance comprising a telephone unit having a telephone function and an information processing apparatus having data input and data processing functions, said telephone unit and said information processing apparatus each being capable of being operated separately or in combination with each other, said information processing apparatus including an apparatus control portion at least capable of conducting control of said data input and data processing functions when said information processing apparatus is separated from said telephone unit, said telephone unit including a telephone control portion at least capable of conducting control of said telephone function when said telephone unit is separated from said information processing apparatus, said apparatus control portion and said telephone unit control portion being electrically connectable to each other so that said telephone function and said data input processing function are both controlled by said apparatus control portion when said information processing apparatus and said telephone unit are electrically connected with each other, in which said telephone unit including a handset, a handset mount portion for mounting said handset thereon, and a flat apparatus-body mount portion provided integrally with said handset mount portion for mounting said information processing apparatus thereon, said apparatus-body mount portion being provided at an upper surface thereof with dial buttons and an indication lamp over which said information processing apparatus is mounted when said information processing apparatus and said telephone unit are combined.

5. An information appliance according to claim 4, in which a positioning mechanism is provided between said information processing apparatus and said telephone unit so that said positioning mechanism operates when said information processing apparatus and said telephone unit are combined with each other.

6. An information appliance according to claim 4, in which said apparatus-body mount portion is formed with a slant surface.

7. An information appliance comprising a telephone unit having at least a telephone function and an information processing apparatus having at least a data input/processing function, said telephone unit and said information processing apparatus being arranged so as to be capable of being separably combined with each other, said information processing apparatus including an apparatus control portion at least capable of conducting control of said data input processing function in a condition in which said information processing apparatus is separated from said telephone unit, said telephone unit including a telephone control portion at least capable of conducting control of said telephone function in a condition in which said telephone unit is separated from said information processing apparatus, said apparatus control portion and said telephone unit control portion being electrically connectable to each other so that said telephone function and said data input processing function are systematically processed in a condition in which said information processing apparatus and said telephone unit are combined with each other, said telephone unit including a handset mount portion for mounting a handset thereon, and a flat apparatus mount portion provided integrally with said handset mount portion for mounting said information processing apparatus thereon, said apparatus mount portion being provided at an upper surface thereof with dial buttons and an indication lamp, and further including a positioning mechanism provided between said information processing apparatus and said telephone unit so that said positioning mechanism operates when said information processing apparatus and said telephone unit are combined with each other, said positioning mechanism including engagement projection means provided on one of said telephone unit and said information processing apparatus, and engagement recess means engaged with said engagement projection means and provided on the other of said telephone unit and said information processing apparatus.

8. An information appliance according to claim 7, in which said engagement projection means and said engagement recesses are provided with electrical connection terminals by which said telephone unit and said information processing apparatus are electrically connected to each other when said telephone unit and said information processing apparatus are combined with each other.

9. An information appliance comprising: a telephone unit having a telephone function; an information processing apparatus capable of performing only data input and data processing functions, said telephone unit and said information processing apparatus being capable of being physically separated so as to be operated separately from each other and physically joined with said information processing apparatus mounted on said telephone unit so as to be operated in combination with each other; a mechanism for electrically coupling said telephone unit and said information processing apparatus when said information processing apparatus is mounted on said telephone unit; means for transferring data and control signals between said information processing apparatus and said telephone unit when said apparatus and said unit are mounted together; and control means in said information processing apparatus for controlling both data input for said telephone function of said telephone unit and data input and data processing functions of said information processing apparatus when said information processing apparatus is physically mounted on said telephone unit.

10. An information appliance according to claim 9, in which said mechanism includes engagement projection means provided on one of said telephone unit and said information processing apparatus, and engagement recess means engaged with said engagement projection means and provided on the other of said telephone unit and said information processing apparatus, said engagement projection means and said engagement recess means being provided with electric power supply menans.

11. An information appliance according to claim 9, wherein said means for transferring data and control signals comprises an optical coupling unit including a light reception/emission device in said telephone unit and a light reception/emission device in said information processing apparatus.

* * * * *